United States Patent [19]

Scragg

[11] Patent Number: 4,471,937
[45] Date of Patent: Sep. 18, 1984

[54] FLUID FLOW CONTROL VALVE

[76] Inventor: Edgar P. Scragg, 60 Mulder St., Florida Park Extn. 3, Florida, Transvaal, South Africa

[21] Appl. No.: 528,738

[22] Filed: Sep. 1, 1983

[51] Int. Cl.³ .................... F16K 21/04; F16K 31/12
[52] U.S. Cl. .................................. 251/23; 137/244; 251/38; 251/45
[58] Field of Search .................. 251/15, 21, 23, 38, 251/45; 137/244; 239/67, 68, 69, 70, 123

[56] References Cited

U.S. PATENT DOCUMENTS

| | | | |
|---|---|---|---|
| 1,295,250 | 2/1919 | Yeiser | 239/583 |
| 1,711,234 | 4/1929 | Langdon | 251/45 |
| 2,154,811 | 4/1939 | Goss | 137/244 |
| 2,181,581 | 11/1939 | Fraser | 137/244 |
| 2,833,300 | 5/1958 | Sirotek | 137/244 |
| 3,111,271 | 11/1963 | Lofgren | 239/117 |
| 3,351,316 | 11/1967 | Lewis | 251/38 |
| 3,752,174 | 8/1973 | Turolla | 137/244 |
| 4,022,380 | 5/1977 | Scragg | 251/38 |
| 4,204,557 | 5/1980 | Scragg | 251/45 |

Primary Examiner—Daniel J. O'Connor
Attorney, Agent, or Firm—Ladas & Parry

[57] ABSTRACT

A fluid flow control valve in which flow from an inlet (14) to an outlet (16) is controlled by engagement between a surface (92) and a seat (90). The surface (92) is displaced from the seat (90) when a closure member (44) is lifted to permit flow from a control chamber (26) through a bore (42). The resultant pressure drop in the chamber (26) enables pressure externally of the chamber (26) to displace the wall (34) which lifts the spigot 40 and hence the surface 92. When the closure member (44) re-seats, the chamber (26) can fill through a bore (56) and the wall (34) returns to its initial condition to close the valve. An operating member (66) protrudes through a shower rose (20). When the member (66) is pushed up, the piston (70) attempts to slide in the cylinder (74) and causes a pressure increase which thus displaced the cylinder (74) and hence the closure member (44). If the operating member (66) is then improperly held in its upper position, leakage between the piston and the cylinder still permits the member (44) to drop and re-engage with its seat in the bore (42).

4 Claims, 2 Drawing Figures

FLUID FLOW CONTROL VALVE

BACKGROUND TO THE INVENTION

Push button taps which have automatic closing mechanisms are widely used particularly in public facilities. The reason for this is that very considerable wastage of water can result when taps are not turned off after the user has finished. Valves with automatic closing mechanisms are also in use in public showers and showers in industrial facilities. Once activated, such valves remain open for a predetermined period of time and then close. Again, the water wastage which results from showers being left running is eliminated.

If some improper means is found by a user to hold the operating button or other operating element of such a tap or valve in its actuated position, the shower or tap remains open and water runs constantly to waste.

OBJECT OF THE INVENTION

The object of the present invention is to provide a fluid flow control valve which will close even though the operating button or other operating element of the valve is held in its actuated position.

BRIEF DESCRIPTION OF THE INVENTION

According to the present invention there is provided a fluid flow control valve comprising a body, a main inlet to the body, a main outlet from the body, a control chamber having a movable wall part and a fixed wall part, a restricted inlet connecting the interior of the control chamber to said main inlet, an outlet from the control chamber, a closure member normally engaging a valve seat to close said outlet from the control chamber, an operating member for unseating said closure member thereby to open the outlet from the control chamber, a main valve seat and co-operating sealing surface arranged to move apart when said valve closure member is unseated to open the outlet from the control chamber and allow the movable wall part to move under the influence of pressure externally of the control chamber, and walling which bounds a chamber of variable volume and forms the connection between the operating member and the closure member, the arrangement being such that when said operating member is displaced to open the valve, part of said walling moves therewith and there is a pressure build-up in the variable volume chamber whereby another part of said walling moves and displaces said closure member, leakage from the variable volume chamber defined by said walling enabling said closure member to move with respect to the displaced operating member to the position in which it engages its valve seat.

In one form said walling is constituted by two relatively displaceable elements. Preferably, said elements are a piston and a cylinder. Desirably the piston is fast with the operating member.

BRIEF DESCRIPTION OF THE DRAWINGS

For a better understanding of the present invention, and to show how the same may be carried into effect, reference will now be made, by way of example, to the accompanying drawing in which.

DETAILED DESCRIPTION OF THE DRAWINGS

Figure 1:
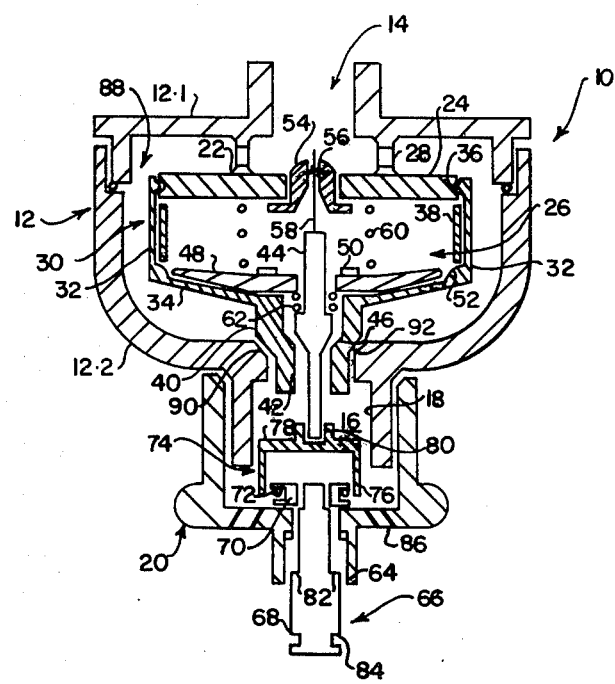
FIG. 1 is an axial section through a shower valve.

The valve illustrated in FIG. 1 is generally designated 10 and comprises a body 12 consisting of two parts 12.1 and 12.2 which are screwed together, there being a water inlet to the body at 14 and a water outlet from the body at 16. The outlet 16 is bounded by an externally threaded spigot 18 and a shower rose 20 is screwed onto the spigot 18.

A ring 22 depending from the body part 12.1 carries a disc 24 constituting the fixed wall of a control chamber 26. The ring 22 has a series of apertures 28 therein. A resilient cup 30 of synthetic plastics material comprises a cylindrical wall 32 and a frusto-conical wall 34. Internally of the wall 32, and at the end thereof remote from the wall 34, there is a bead 36 which is received in a peripheral groove of the disc 24 thereby to mount the cup 30 on the disc 24. Internally of the wall 32 there is a sleeve 38 of relatively rigid material, the sleeve 38 preventing inward collapse of the wall 32 under external pressure.

A spigot 40 stepped both internally and externally protrudes from the centre of the wall 34. A bore 42 through the spigot 40 forms the outlet from the control chamber 26. A valve closure member 44 passes through the bore 42 and cooperates with a seat 46 formed by the internal step of the spigot 40.

A frusto-conical disc 48 is secured by screws 50 to the spigot 40 and lies within the chamber 26 adjacent the inner face of the wall 34. A strengthening bead 52 encircles the cup 30 internally where the walls 32 and 34 merge with one another.

The disc 24 has a central aperture therein and a jet 54 is a push-fit in this aperture. The jet 54 has a fine metering bore 56 therein, a cleaning and flow control needle 58 carried by, or forming part of, the member 44 moving in the bore 56.

A spring 60 is provided between the disc 24 and one face of the disc 48, and a smaller spring 62 is provided between a shoulder of the member 44 and the other face of the disk 48.

The shower rose 20 has a central aperture 64 through which an operating member 66 protrudes. The member 66 comprises a stem 68 and a piston 70 screwed onto the stem 68. The piston 70 has a peripheral groove in which there is a U-seal 72.

The piston 70 slides in a cylinder 74 which includes a cylindrical side wall 76 and a transverse end wall 78. On the outer face of the end wall 78 there is a socket 80 which receives the lower end of the closure member 44.

The stem 68 is stepped so as to provide a shoulder 82 and is formed with a groove 84 which facilitates gripping of the stem.

The apertures through which water emerges from the shower rose 20 are shown at 86.

It will be seen from FIG. 1 that the control chamber 26 lies within a main chamber 88 bounded by the body parts 12.1 and 12.2. A valve seat 90 on the body part 12.2 co-operates with a frusto-conical sealing surface 92 formed by the external step of the spigot 40.

In use of the valve, water under pressure enters the chamber 88 through the inlet 14, the water passing through the apertures 28 in the ring 22. The pressure in the control chamber 26 is the same as the pressure in the main chamber 88 and the springs 60 and 62 respectively hold the surface 92 against the seat 90 and the member 44 against its seat 46. The valve is thus closed.

To open the valve, the stem 68 is pushed upwardly so that the piston 70 slides in the cylinder 74. Depending on operating conditions, the cylinder 74 may be air filled or water filled. In either case, pressure builds up in the closed cylinder as the piston 70 slides upwardly in the cylinder 74. The cylinder 74 thus tends to move upwardly carrying the member 44 with it against the action of the spring 62.

Immediately the member 44 lifts off its seat 46, there is a drop in pressure in the control chamber 26. Pressure in the chamber 88 acting on the external face of the conical wall 34 causes deformation of this wall with the result that the central part of this wall and the spigot 40 lift. This has the effect of separating the surface 92 from the seat 90 thereby placing the inlet 14 and outlet 16 in communication and opening the valve.

As the valve closure member 44 is displaced, the needle 58 moves in the bore 56 thereby dislodging any particles or scale that may have accummulated in the region of the bore 56.

When the member 66 is released after having been pressed upwardly, it immediately moves downwardly to return to the position illustrated. Such downward movement is partly due to pressure in the cylinder 74 and partly due to the flow of water through the aperture 64 in which the stem 68 is a relatively loose fit. It will be understood that the flowing water impinges on the shoulder 82 and that this also assists in moving the member 66 towards its lowermost position. The cylinder 74 and hence the member 44 move downwardly with the member 66 so that the outlet from the control chamber constituted by the bore 42 in the spigot 40 closes as the member 44 engages the seat 46.

The control chamber 26 then commences to fill and the rate at which filling takes place depends partly on inlet pressure and partly on the annular gap between the needle 58 and the surface of the bore 56. As the control chamber 26 fills, the spigot 40 steadily moves downwards and eventually the surface 92 engages the seat 90 to close-off flow through the valve.

Another possible operating condition arises when the member 66 is pressed upwardly to initiate water flow through the valve, and the stem 68 is then fixed in some way in its uppermost position. In the absence of the structure described, this can have the effect of holding the member 44 away from the seat 46 so that the chamber 26 cannot fill. The result of this is that the valve remains open continuously.

With the structure described, the pressure initially created in the cylinder 74 as the stem 68 is pushed upwardly diminishes as soon as upward movement of the stem 68 and cylinder 74 ceases. Such a decrease in pressure can be caused by allowing controlled leakage past the seal 72. Such leakage is too slow to prevent the desired pressure build-up in the cylinder 74 when the member 66 is moved upwardly. The result of this is that, even though the stem 68 may be held in its uppermost position, the cylinder 74, and hence the member 44, can slide downwardly with respect to the piston 70 thereby permitting the valve to close after the requisite period of time even though the stem 68 may have been improperly retained in its uppermost position.

Figure 2:
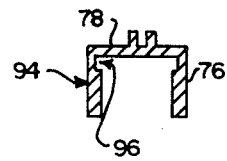
FIG. 2 illustrates a modified form of one component of the valve of FIG. 1.

In FIG. 2 a modified form of the cylinder 74 is shown and is designated 94. The cylinder 94 differs from the cylinder 74 in that there is, in the side wall 76 and adjacent the transverse end wall 78, a groove 96 which receives the U-seal 72 when the stem 68 is pressed to its uppermost position. The width of the groove 96 is such that even though the stem 68 is retained improperly in its uppermost position, the permitted downward movement of the cylinder 74 is sufficient to permit the member 44 to engage the seat 46 and shut-off the shower.

While a piston and cylinder is preferred, it is also possible to use a bellows which connects the members 44 and 66. In another form, each of the members 44, 66 is connected to a saucer-shaped diaphragm. The diaphragms constitute said elements, are connected to one another along their peripheries, and define a variable volume chamber between them.

I claim:

1. A fluid flow control valve comprising a body, a main inlet to the body, a main outlet from the body, a control chamber having a movable wall part and a fixed wall part, a restricted inlet connecting the interior of the control chamber to said main inlet, an outlet from the control chamber, a closure member normally engaging a valve seat to close said outlet from the control chamber, an operating member for unseating said closure member thereby to open the outlet from the control chamber, a main valve seat and cooperating sealing surface arranged to move apart when said valve closure member is unseated to open the outlet from the control chamber and allow the movable wall part to move under the influence of pressure externally of the control chamber, and walling which bounds a chamber of variable volume and forms the connection between the operating member and the closure member, the arrangement being such that when said operating member is displaced to open the valve, part of said walling moves therewith and there is a pressure build-up in the variable volume chamber whereby another part of said walling moves and displaces said closure member, leakage from the variable volume chamber enabling said closure member to move with respect to the displaced operating member to the position in which it engages its valve seat.

2. A fluid flow control valve according to claim 1, wherein said walling is constituted by two relatively displaceable elements.

3. A fluid flow control valve according to claim 2, wherein said elements are a piston and a cylinder.

4. A fluid flow control valve according to claim 3, wherein the piston is fast with the operating member.

* * * * *